(12) United States Patent
Stearns et al.

(10) Patent No.: US 8,503,266 B1
(45) Date of Patent: Aug. 6, 2013

(54) ACOUSTIC FLUID HEIGHT MONITORING USING DYNAMIC SURFACE PERTURBATIONS

(75) Inventors: Richard G. Stearns, Felton, CA (US); Sammy S. Datwani, Pleasanton, CA (US)

(73) Assignee: Labcyte Inc., Sunnyvale, CA (US)

( * ) Notice: Subject to any disclaimer, the term of this patent is extended or adjusted under 35 U.S.C. 154(b) by 0 days.

(21) Appl. No.: 13/338,017

(22) Filed: Dec. 27, 2011

Related U.S. Application Data

(63) Continuation of application No. 12/630,420, filed on Dec. 3, 2009, now Pat. No. 8,107,319.

(51) Int. Cl.
*G01S 15/00* (2006.01)
*G01S 15/88* (2006.01)

(52) U.S. Cl.
CPC .................................... *G01S 15/88* (2013.01)
USPC ............................................................ 367/99

(58) Field of Classification Search
USPC ............................................................ 367/99
See application file for complete search history.

(56) References Cited

U.S. PATENT DOCUMENTS

| | | | | |
|---|---|---|---|---|
| 5,739,432 | A * | 4/1998 | Sinha | 73/579 |
| 6,938,995 | B2 * | 9/2005 | Mutz et al. | 347/75 |
| 7,354,141 | B2 * | 4/2008 | Ellson et al. | 347/75 |
| 8,107,319 | B2 * | 1/2012 | Stearns et al. | 367/99 |
| 2007/0153049 | A1 * | 7/2007 | Mutz et al. | 347/20 |
| 2007/0209440 | A1 * | 9/2007 | Dockendorff et al. | 73/642 |
| 2010/0307251 | A1 * | 12/2010 | Welle et al. | 73/627 |

* cited by examiner

*Primary Examiner* — Isam Alsomiri
*Assistant Examiner* — James Hulka
(74) *Attorney, Agent, or Firm* — Fenwick & West LLP

(57) ABSTRACT

A method of determining the volume or height of fluid in a reservoir is provided. A first burst of focused acoustic energy is used to raise temporarily a protuberance on a free surface of the fluid. A second burst of acoustic energy is directed to the free surface of the fluid. Echoes from the second burst of acoustic energy are detected. The detected echoes are employed to compute the height of the fluid.

25 Claims, 8 Drawing Sheets

ACOUSTIC FLUID HEIGHT MONITORING USING DYNAMIC SURFACE PERTURBATIONS

CROSS REFERENCE TO RELATED APPLICATIONS

This application is a continuation of co-pending U.S. application Ser. No. 12/630,420, filed Dec. 3, 2009, which is incorporated by reference herein in its entirety.

TECHNICAL FIELD

This application relates to acoustics and in particular to the use of acoustics to monitor the height of a fluid in a reservoir.

BACKGROUND

In chemistry and biotech it is common to prepare solutions or suspensions and store them for considerable periods of time. This is commonly done, for example, using the wells of a well plate or in plastic tubes placed into a tube holder. Because solutions and suspensions are subject to processes such as solvent evaporation or hydration which may change both their volume and composition over time, it is often useful to periodically determine the height and/or volume of the fluid in a reservoir.

It can also be desired to determine the height of a fluid in a reservoir in order to eject droplets from it. When acoustic ejection is employed (as described for example in U.S. Pat. No. 6,666,541), it is desirable that the focal point of the acoustic energy be near the surface of the fluid. It is therefore desirable for the person or machine controlling the ejection process to know the height of the fluid in the reservoir.

In U.S. Pat. No. 6,938,995, techniques are disclosed for using focused acoustic energy to determine the height and/or volume of the fluid in a reservoir. A toneburst of focused acoustic energy is applied to the reservoir from the outside (commonly from below). The reflections of the focused acoustic energy pulse are detected. Based on the time between the pulse transmission and reflections the height can in many cases be computed. A simple way to compute the height is to multiply the speed of sound in the fluid by one half the time between receipt of an echo from the top of the bottom of the reservoir and receipt of an echo from the fluid surface.

It is known that the free surface of a fluid is not necessarily flat, but can have varying shapes. Commonly the free surface has a somewhat concave shape often called a "meniscus." The surface is approximately flat and horizontal at the center of the container and tilted toward the edges of the container. Existing techniques for determining the height and/or volume of a reservoir work reasonably well with these kinds of free surfaces. In the case of liquid metals (e.g., mercury at room temperature) or polymeric solutions (e.g., polyisobutylene) in a low shear flow, the free surface of the fluid often has a convex shape.

FIG. 1 illustrates schematically a known arrangement for using focused acoustic energy to measure fluid height in a reservoir such as 10. An acoustic transducer with a focusing means 14 produces focused acoustic energy 12. The energy travels towards the surface of the fluid in reservoir 10. (In normal use an acoustic coupling medium, e.g., water, would occupy the space between the transducer 14 and the bottom of the reservoir 10.) Some of the acoustic energy reflects off the surface of the fluid in reservoir 10 and returns to the transducer 14, where it is sensed.

FIG. 2 depicts a typical waveform that is received at the transducer 14 when the outgoing focused acoustic energy is a pulse-like waveform of a few cycles. As may be seen, there are three distinguishable echoes, first BB from the bottom of the bottom of the reservoir, then TB from the top of the bottom of the reservoir, and then SR which is the reflection from the surface of the fluid in reservoir 10. From the graph one can determine the time difference between the reflections from the bottom of the reservoir and the surface of the fluid. With knowledge of the speed of sound in the fluid in the reservoir, it is straightforward to calculate the additional distance which the echo from the surface of the fluid traveled compared to the echo from the top of the bottom of the reservoir, i.e., the height of the fluid in the reservoir. The computation may readily be automated using a microprocessor or personal computer.

There is a need, however, for methods of determining free surface height which work well for surfaces with more unusual shapes.

SUMMARY OF THE INVENTION

A method of determining the volume or height of fluid in a reservoir is provided. In the method, one uses focused acoustic energy to raise temporarily a protuberance on a free surface of the fluid. One then detects the reflection of a pulse of acoustic energy from the protuberance in order to measure the acoustic energy time of flight from acoustic transducer to the free surface of the fluid. The ratio of the reflected energy detected to the energy sent out is increased as a result of the temporary protuberance.

DETAILED DESCRIPTION OF PREFERRED EMBODIMENTS

Figure 1:
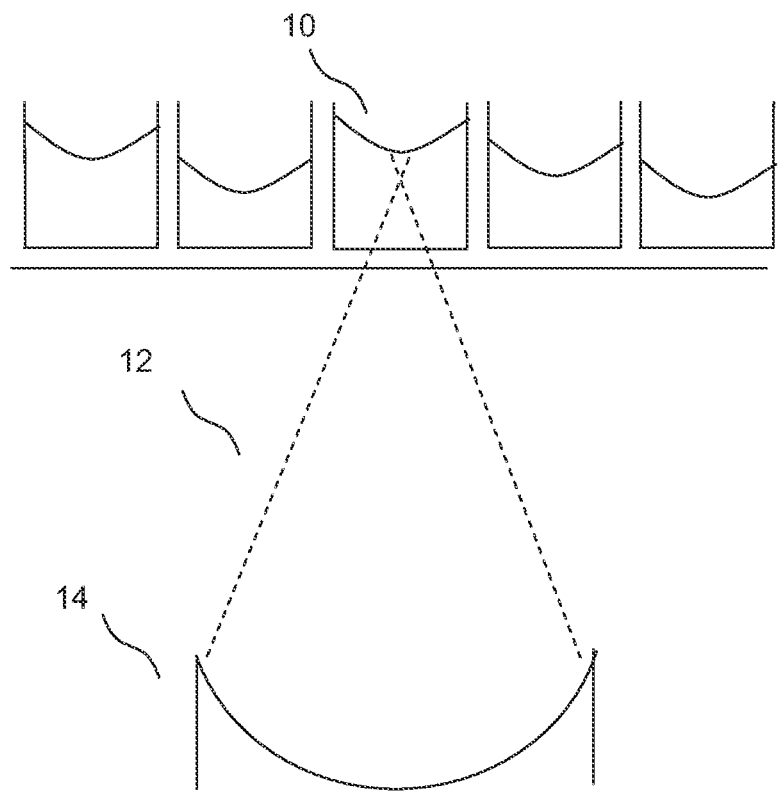
FIG. 1 (prior art) depicts schematically an arrangement for determining the height of a fluid in a reservoir forming part of a well plate by means of focused acoustic energy.

Before describing the present invention in detail, it is to be understood that this invention is not limited to specific solvents, materials, or device structures, as such may vary. It is also to be understood that the terminology used herein is for the purpose of describing particular embodiments only, and is not intended to be limiting.

As used in this specification and the appended claims, the singular forms "a," "an," and "the" include both singular and plural referents unless the context clearly dictates otherwise. Thus, for example, reference to "an active ingredient" includes a plurality of active ingredients as well as a single active ingredient, reference to "a temperature" includes a plurality of temperatures as well as single temperature, and the like.

For information regarding words which have multiple meanings, reference is made to The Oxford English Dictionary (2d ed. 1989), the McGraw-Hill Dictionary of Scientific and Technical Terms (6th ed. 2002) and to Hawley's Condensed Chemical Dictionary (15th ed. 2007), which are incorporated by reference herein. The inclusion of these references is not intended to imply that every definition in them is necessarily applicable here, as persons of skill in the art would often see that a particular definition is not in fact applicable in the present context.

Where a range of values is provided, it is intended that each intervening value between the upper and lower limit of that range and any other stated or intervening value in that stated range is encompassed within the disclosure. For example, if a range of 1 μm to 8 μm is stated, it is intended that 2 μm, 3 μm, 4 μm, 5 μm, 6 μm, and 7 μm are also disclosed, as well as the range of values greater than or equal to 1 μm and the range of values less than or equal to 8 μm.

In this application reference is sometimes made to "horizontal" or "vertical" in terms of the standard acoustic ejection configuration in which a fluid is in a reservoir and has a free surface which is approximately horizontal, i.e., perpendicular to the direction of the earth's gravity. However, it is also possible for a fluid to be retained in a reservoir and have a free surface not approximately horizontal, e.g., a fluid retained in the reservoir by surface forces including its own surface tension despite the reservoir being sideways or upside-down.

In this application the following abbreviations are used: SR—surface reflection, TOF—time of flight, TB—top of the bottom of a reservoir, BB—bottom of the bottom of a reservoir, FCS—fetal calf serum, PBS—phosphate buffered saline, BSA—bovine serum albumin, V pp—is the voltage peak-to-peak signal.

It has been found that for certain fluids, the free surface of the fluid in a reservoir in storage may not be a simple or symmetrical meniscus. Instead, there can be an overall inclination of the free surface relative to the horizontal. Typically the form that the surface assumes resembles a tilted meniscus, depicted schematically as item 16 in FIG. 3.

Figure 2:
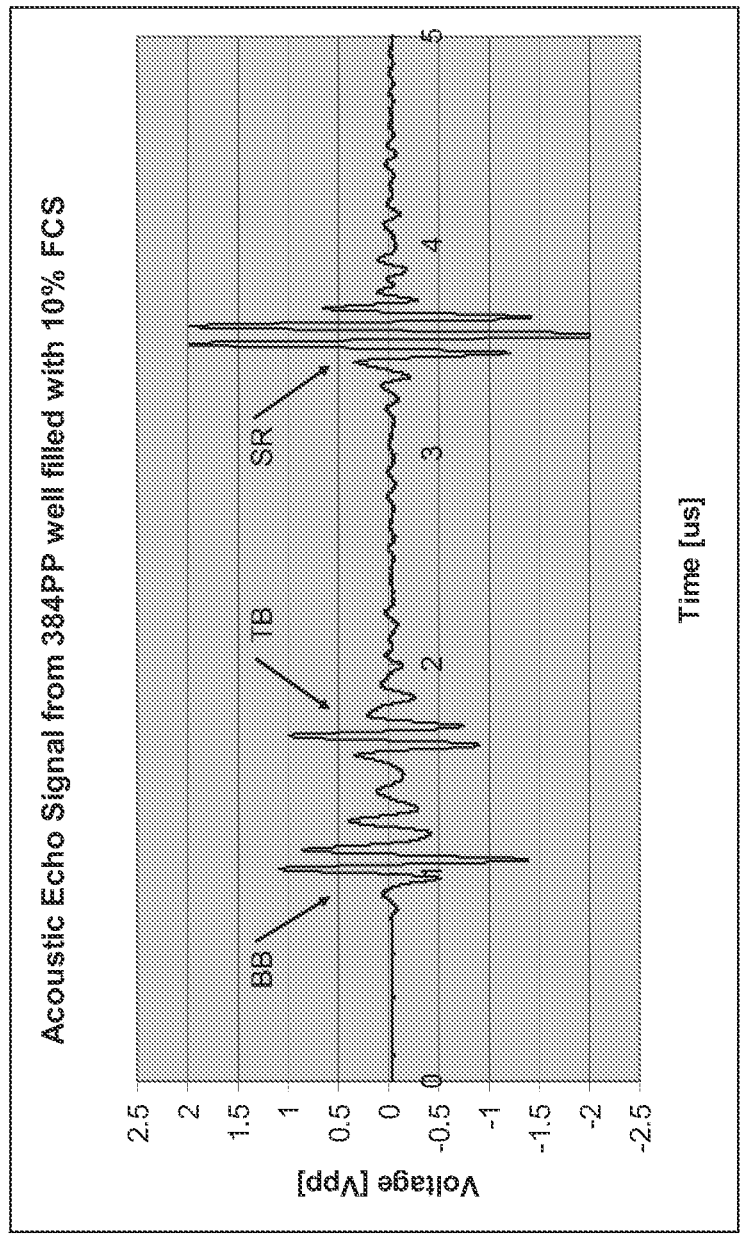
FIG. 2 (prior art) depicts an echo waveform received by an acoustic transducer following the sending of a toneburst of acoustic energy to the surface of a normal horizontal meniscus such as that in FIG. 1.
Figure 3:
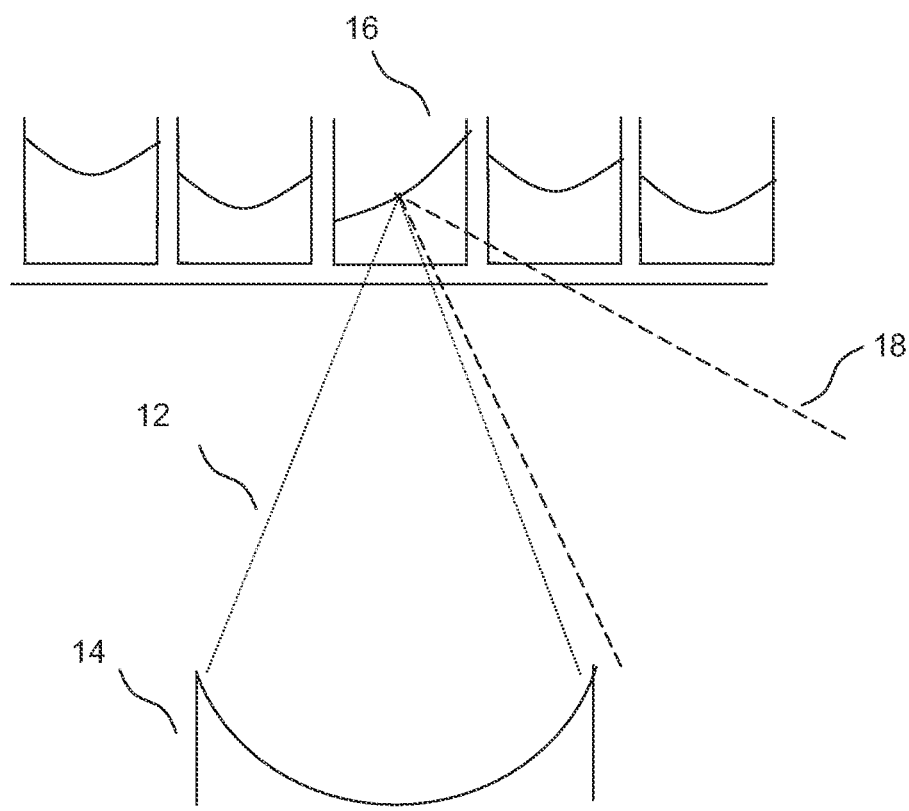
FIG. 3 depicts schematically a reservoir with a tilted meniscus and the effect of that meniscus on the reflection of acoustic energy.
Figure 4:
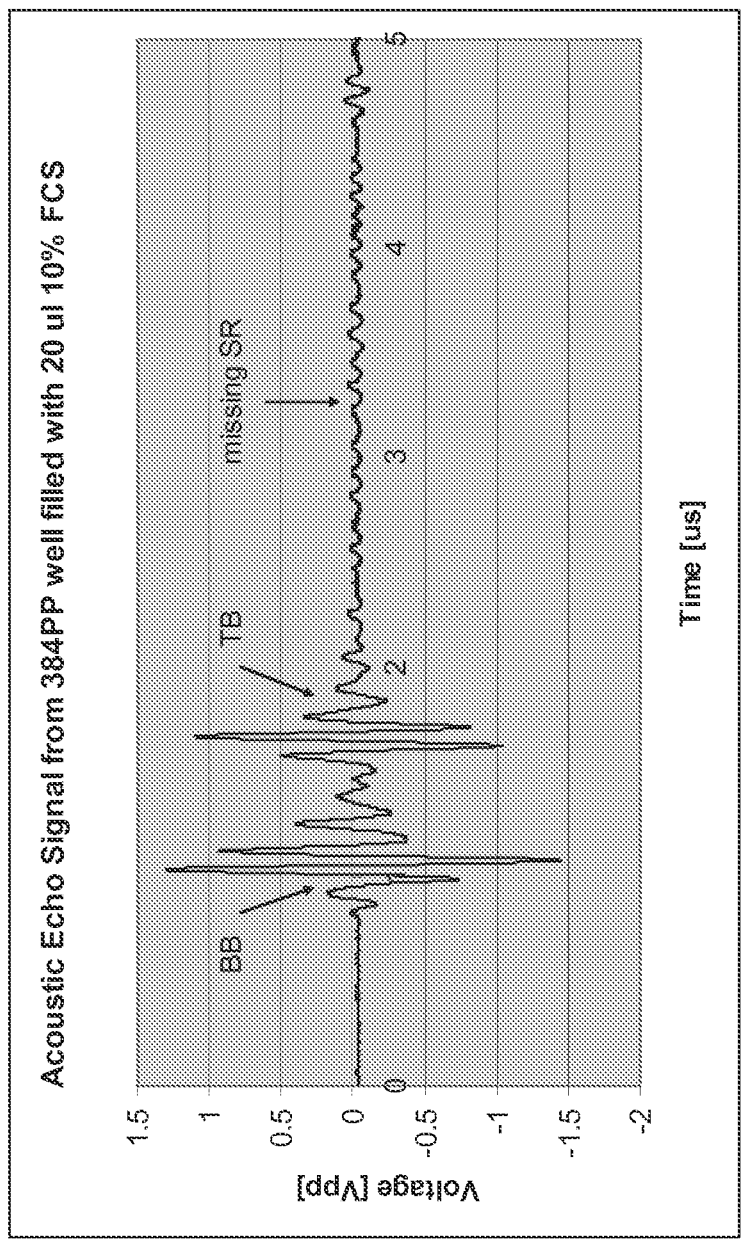
FIG. 4 depicts an echo waveform received by an acoustic transducer following the sending of a toneburst of acoustic energy to the surface of a tilted horizontal meniscus such as that in FIG. 3.

In FIG. 3 we see a possible result of a tilted meniscus. The acoustic energy 12 which is directed by transducer 14 to the reservoir, rather than echoing back to the transducer as in FIG. 1, instead reflects in a lateral direction 18 due to the tilt of the meniscus. (To a first approximation, the reflection will follow the acoustic analog of geometric optics, including the geometric optics rule that the angle of incidence relative to the surface normal is equal to the angle of reflection.) This results in a very low echo signal from the surface at the transducer, as show in FIG. 4. If one compares FIG. 2 with FIG. 4, one sees that the echo from the surface of the fluid SR is significantly reduced. If the SR signal is diminished sufficiently, it may not be possible to recognize the signal, and therefore not possible to calculate the fluid height, using the algorithm for fluid height determination discussed in the Background of the Invention.

A limited list of fluids that exhibit highly tilted meniscuses (which is by no means exhaustive) is as follows for a 384-well polypropylene microplate: (a) 10% FCS in 1×PBS, (b) 1% BSA in 1×PBS, (c) 1% BSA with 0.005% Triton x-100 in 1×PBS, (d) 10% Sorbitol in 1×PBS.

Centrifugation of a well plate will often lead to the formation of a tilted meniscus in some of the wells of a well plate, generally those on the edges. A centrifugation step is routine in many automated liquid handling systems to remove bubbles from the wells of dissolved protein solutions. Such a step can eliminate some of the irregular meniscus shapes due to dispensing, such as when a pipette tip dispenses the liquid on a well wall, but centrifugation (common to automated microplate handling) can create a tilt in a flat meniscus in some instances, specifically at the edges of the well plate. Since the distance from the point about which the rotor of the centrifuge rotates is not extremely large in comparison to the length of the microplate, the wells on the left and right of the plate experience the centrifugal force at a significant angle, driving the well fluids towards the left wall of each well on the left side of the plate and the right wall for wells on the right side of the plate. Generally speaking, the smaller the centrifuge rotor and the higher the g-force, the more pronounced tilted meniscus behavior becomes.

In practice, the free surface of a fluid may be tilted by at least about 5 degrees, at least about 10 degrees, at least about 20 degrees, or at least about 30 degrees relative to horizontal. Alternatively, the tilt angle may be defined relative to the direction of propagation of the acoustic energy. In this mode of measurement, one looks at the angle between that direction and the normal to the tangent plane of the fluid surface at its intersection with the acoustic beam.

Figure 8:
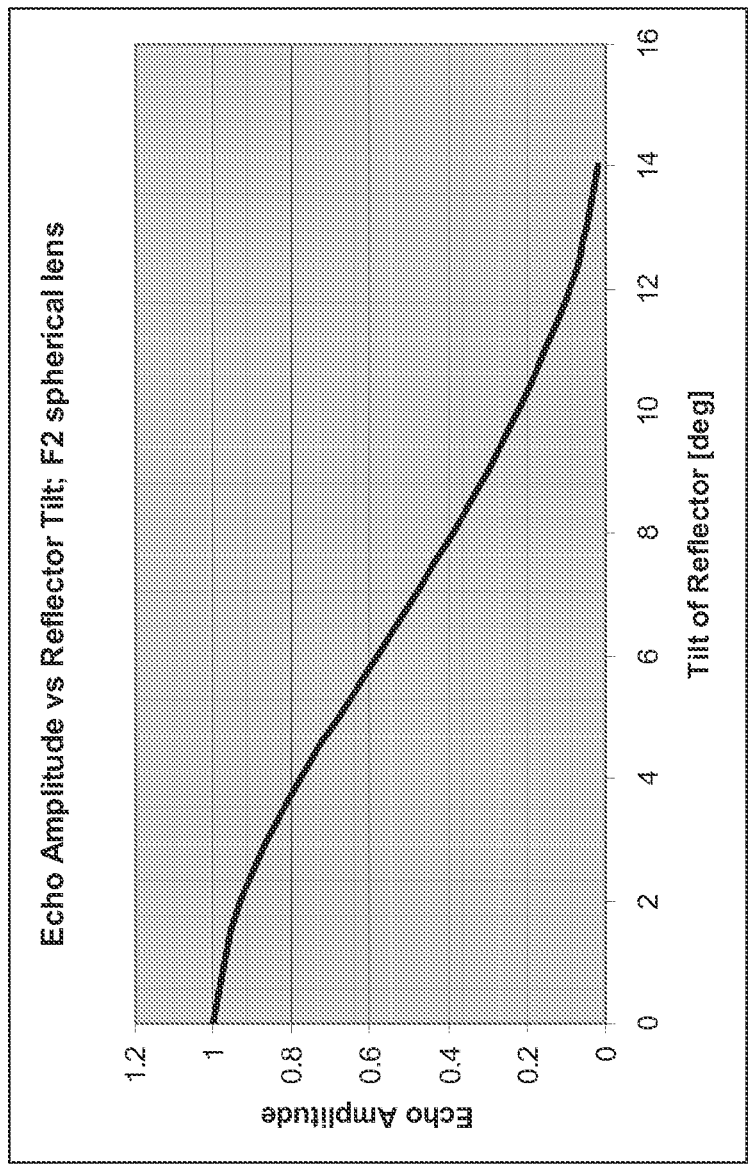
FIG. 8 depicts calculated echo amplitude received at the transducer as a function of reflector tilt.

FIG. 8 shows a plot of the predicted SR echo signal, for an F2 acoustic beam focused at the surface of a tilted meniscus, as a function of the tilt of the meniscus relative to the acoustic beam propagation direction. For the F2 acoustic lens, the echo signal decreases to less than 10% of its nominal value from a flat horizontal meniscus when the meniscus tilt is about 12 degrees. (An Fn acoustic lens is one in which the focal length, i.e., the distance from the lens to the point of focus, divided by the diameter of the portion of the lens which outputs acoustic radiation, is n.)

In an experiment with a Labcyte Echo® 555 dispenser and a 384-well polypropylene plate filled with 20 μL of 10% FCS in 1×PBS solution, it was found that while the center wells would exhibit SR signals with an amplitude of almost 4 Vpp, most wells at both edges of the plate exhibited SR signals below 0.1 Vpp.

In an aspect of the invention, a method of determining the volume or height of fluid in a reservoir is provided. In the method, one uses focused acoustic energy to raise temporarily a protuberance on a free surface of the fluid. One then detects the reflection of a pulse of acoustic energy from the protuberance in order to measure the acoustic energy time of flight from the generator of the toneburst of focused acoustic energy to the free surface of the fluid. This method is believed to be particularly suitable for situations where the free surface of the fluid is a tilted meniscus. That is believed to be because the transient protuberance tends to counteract the echo-signal-weakening effect of the tilted meniscus for a short period of time. The protuberance is sometimes referred to as a "dimple."

Figure 5:
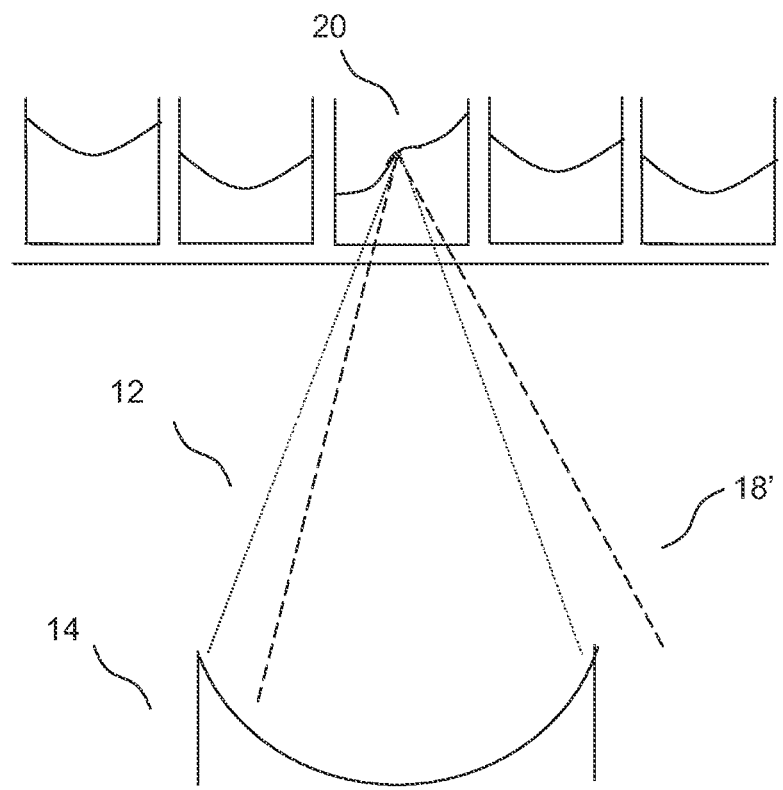
FIG. 5 depicts schematically the effect of creating a protuberance in the fluid surface on the waveform echoed from the surface of the fluid in a situation like that of FIG. 3.

FIG. 5 depicts the effect of the protuberance or dimple on the echo from the surface of a fluid having an inclined meniscus. We see that the surface 20 of the fluid has a protuberance. As a result of that protuberance, the acoustic energy 12 from the transducer 14 is reflected in different directions 18', which are closer to vertical and thus more oriented towards the transducer. This results in a considerably stronger signal at the transducer.

In the method of the invention, the ratio of the reflected energy detected to the energy sent out in the height determination pulse is generally increased as a result of the temporary protuberance. That is because the protuberance makes the reflections come more directly towards the transducer which is used for detecting the reflected energy. The improvement in the ratio of reflected energy detected to energy sent out may be, for example, a factor of at least about 1.5, a factor of at least about 2, a factor of at least about 5, or a factor of at least about 10. Alternatively, one may use as a figure of merit a comparison of (a) the ratio of energy returned to energy sent out for the dimple-forming pulse with (b) the ratio of energy returned to energy sent out for the height determination pulse. For example, (b) may exceed (a) by at least about 1.5 times, at least about 2 times, at least about 5 times, or at least about 10 times.

To generate the protuberance in the fluid surface, focused acoustic energy may be used. The waveform used to generate the protuberance may have the same structure as that used to eject drops (but a lower energy), or the waveform may be different. We may refer to the waveform used to generate the protuberance as the "sub-ejection toneburst." In general there will be a gradual rise and then, after the sub-ejection toneburst, a gradual relaxation of the dimple that is created at the free fluid surface.

Two parameters that may be adjusted in performing height determination with the sub-ejection toneburst are (a) the power in the sub-ejection toneburst itself, and (b) the time delay between the end of the toneburst, and the beginning of the pulse waveform used for height determination. It is desirable that enough power be delivered in the sub-ejection toneburst to create a significant dimple at the free fluid surface—one large enough to improve considerably the reflection characteristics of the acoustic beam from a tilted meniscus. The power is however desirably small enough that unintentional drop ejection will not occur. This is desirably achieved for all fluid fill heights and over the range of fluid properties (e.g. surface tension, viscosity) that are expected to be used in the system. It is also desirably achieved with the focal point of the acoustic energy allowed to be placed within a range of vertical distances, for example ±1 mm, ±2 mm, or ±3 mm, from the fluid free surface. The ability to work with a range of distances is desirable because it may not be desired to take the time to position the acoustic transducer so that the focal point is close to the fluid surface. Alternatively, the distances may be expressed, for example, in terms of wavelengths of the acoustic energy in the fluid at a particular frequency such as 5 MHz or 10 MHz.

Fortunately, it has been found that drop ejection typically requires several dB more acoustic power than the level necessary to create a mound that gives rise to a good SR echo amplitude. One possible exception might be a system that was meant to work over a large range of surface tension and viscosity, such that the acoustic energy necessary for drop ejection varied significantly (e.g., more than several dB) over the fluids within a single plate. In this case, it might be necessary to adjust the sub-ejection toneburst power from one reservoir to another, e.g., from well to well within a plate. Preexisting knowledge about the variation of the fluid contents (e.g., identity of solvent, approximate viscosity, last height measured) could be used to modify the sub-ejection toneburst, if needed. It may be desirable to test a system in advance with the intended fluids or reasonable proxies in order to be sure that the sub-ejection toneburst is really sub-ejection in order to avoid the unintended ejection of a droplet.

A procedure like that described in U.S. Pat. No. 7,354,141 may be employed to ascertain an energy level for the sub-ejection toneburst, for creation of an appropriate protuberance or dimple in a given fluid. Other general information regarding the waveforms to be employed and other aspects of the practice of acoustic height determination may be found in that patent.

Following the sub-ejection toneburst, a pulse of acoustic radiation is sent to reflect off the dimpled fluid surface back to the transducer for fluid height determination. Typically the delay time between the excitation of the sub-ejection toneburst and the fluid-height determination pulse will be between about 100 to 300 µs where the acoustic energy is in the 10 MHz frequency range. This timescale corresponds to that associated with the creation of the dimple at the fluid surface. The timescale is also comparable to the timescale of droplet formation during an ejection process.

The delay time may be set so that the height-determining echo pulse reaches the fluid surface near the time of the maximum dimple amplitude. This would create the maximum echo signal from the tilted surface, for the least total displacement of the surface by the sub-ejection toneburst. It will often be desired to keep the maximum dimple amplitude as small as possible, while still increasing the SR echo signal amplitude to a level that allows robust signal recognition.

The delay time may be set, for example, so that the height-determining echo pulse reaches the fluid surface when the dimple is at least about 25%, at least about 50%, or at least about 75% of its maximum amplitude.

The following are further considerations which enter into the choice of dimple amplitude when the height-determining pulse reaches the fluid surface. If the perturbation of the surface is too large, then the surface height may be overestimated and result in imperfect focus when the height data is used to eject (but see below on ways of compensating for dimple height). Furthermore, the height of the perturbation can change with the closeness of the focus. So, if two wells of different filled depths both have 10-degree slopes when unperturbed at the point of the fluid surface where the acoustic beam is aimed, they can both reflect enough sound when perturbed by a perturbation pulse of the same energy from the same transducer distance from the well bottom. However, the one that is closer to being focused will typically give a larger perturbation, and, hence, a larger change in the perceived fluid depth. The lower the amplitude of the initial sub-ejection toneburst, the smaller the variation of the measurement due to the difference in focus.

In some cases, it could be desirable to set the time delay between the sub-ejection toneburst and the fluid-height determination echo pulse to a value less than that which would result in the acoustic echo signal sampling the fluid surface at the time of maximal dimple height. This may be desirable for example if machine throughput dictates that the delay from one height determination to the next be as small as possible. In practice it is desirable for such delays to be, for example, no more than about 20 ms, no more than about 50 ms, no more than about 0.1 s, no more than about 0.2 s, or no more than about 0.5 s.

A simple expression for the timescale associated with dimple formation is given for example in C. Cinbis, N. N. Mansour, and B. T. Khuri-Yakub, "Effect of Surface Tension on the Acoustic Radiation Pressure-induced Motion of the Water-air Interface," J. Acoustic Soc. Am. 94(4), October 1993, pp 2365-2372. Generalizing their expression, we may express the time to maximum dimple height as $T_{max} \sim 0.24 \times$ $d^{1.5}$ × (rho/sigma)$^{0.5}$. Here the parameters rho and sigma correspond to the density and surface tension of the fluid in the well. The parameter d corresponds to the effective acoustic beam diameter at the free surface of the well fluid. The value of the effective acoustic beam diameter d scales inversely with the acoustic frequency. It is also dependent on how far the focal point is from the free surface of the fluid. In the multi-layer configuration of the acoustic beam passing through the well plate and well fluid as depicted in FIGS. 1, 3, and 5, the value of d is approximately equal to 1.02 times the product of the F-number of the acoustic lens multiplied by the acoustic wavelength in the coupling fluid.

For a measurement using an F2 acoustic transducer, at 11.5 MHz center frequency, the value of d at the focal plane of the transducer is on the order of 0.026 cm. For a well fluid of density rho=1.1 g/cm$^3$, and surface tension of sigma=45 mN/m, the value of $T_{max}$ is thus on the order of 190 µs. If the fluid surface is somewhat above or below the focal plane of the transducer, the value of the effective acoustic beam diameter d at the fluid surface will be slightly larger, and hence the value of $T_{max}$ will increase. For some well fluids, the depth of focus of an F2 acoustic beam in the well is approximately 28 times the acoustic wavelength, which at 11.5 MHz is approximately 130 µm. Thus, the effective acoustic beam diameter d, and therefore the value of $T_{max}$ will remain fairly constant over a fluid height range of about 3.5 mm. This relative insensitivity of the effective acoustic beam diameter d at the well fluid surface, to changes in the height of the fluid surface, makes it possible to use a single value of delay between the sub-ejection toneburst and the fluid-height determination echo pulse, over the full range of well fluid volumes, for many well plate types.

Experiments were carried out on a Labcyte Echo® 555 varying the amplitude of the sub-ejection toneburst and the delay between the sub-ejection toneburst and the subsequent height determination pulse. These experiments were carried out with 10% FCS in 1×PBS, in a 384-well polypropylene microplate. From these experiments, it appeared that a robust operating condition would be a sub-threshold toneburst energy approximately 4 to 5 dB below the threshold energy required to create a drop at the fluid surface, when the acoustic beam was optimally focused at that surface. A robust setting for the gap between the sub-ejection toneburst and height determination pulse was found to be 210 to 240 µs.

More generally, for other liquids and for other ejection systems, different timings and amplitudes could be employed, which would be determined by routine experimentation in each case. For example, one might select the sub-ejection toneburst amplitude relative to that minimally required for ejection, for example between 4 to 5 dB below that ejection threshold amplitude, with the toneburst shape (e.g., frequency) being the same for ejection as for the sub-ejection toneburst. One might select the time gap between the sub-ejection toneburst and height determination pulse by means of the formula given above, and setting the gap between 0.5 $T_{max}$ and 2.0 $T_{max}$.

With appropriate timing and energy levels for the sub-ejection toneburst, and applied to reservoirs where the fluid has a tilted surface, the methods of the invention may achieve, for example, SR echo signal levels at least about 2 times those that would be achieved without the sub-ejection toneburst, at least about 3 times, at least about 5 times, or at least about 10 times.

Figure 6:
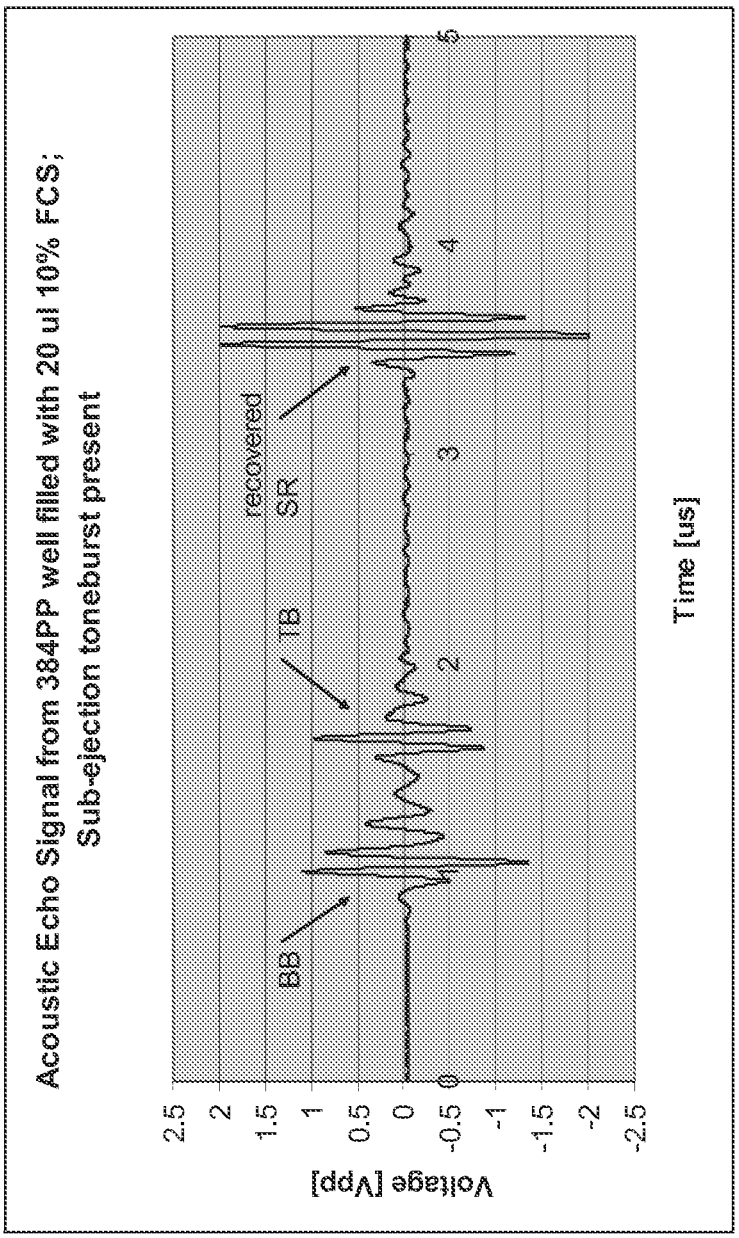
FIG. 6 depicts an echo waveform received by an acoustic transducer following the sending of a toneburst of acoustic energy to the surface of a tilted horizontal meniscus with a dimple such as that in FIG. 5.

FIG. 6 shows the beneficial effect of the dimple on the signal strength of the SR echo from the pulse for height determination. However, with a flat meniscus, the dimple may result in a somewhat lower detected SR reflection value compared to not using a dimple. A flat surface will typically be a more efficient reflector to a beam focused close to it than the dimple, as some of the energy of the beam that hits the dimple may not go back to the source.

When there is a dimple in the fluid surface, the height being measured is somewhat greater than in the absence of a dimple. Thus, it may be desirable to subtract a compensatory value from the height measured with the dimple present. The additional height will be dependent on the energy of the sub-ejection toneburst. For accuracy, it may be desirable to measure the extra height obtained in representative conditions (e.g., representative reservoir sizes, fluid volumes, and fluid compositions). There are various methods for doing so, but a possible method is to (a) use a representative reservoir containing a representative volume of the fluid of interest having a flat meniscus and (b) determine the difference in heights measured with and without the sub-ejection toneburst.

It has been found that the extra height resulting from the presence of the dimple varies with the height of the fluid (and thus of the fluid volume), at least when the acoustic transducer position is fixed in the vertical direction during the height measurement. The amount of variation is in turn a function of the energy of the sub-ejection toneburst. Lower energies generally produce a smaller variation of extra height with fluid volume. In the conditions of the experiments described in this application on the Labcyte Echo® 555, it was found that a sub-ejection toneburst of amplitude 1.02V (3.3 dB below drop ejection threshold) produced considerably greater variation of the extra height as a function of fluid volume than one which was 0.93V in amplitude (4.1 dB below drop ejection threshold). In general, it is desirable to choose a sub-ejection toneburst energy which does not produce a large variation of extra height with fluid volume. This may conveniently be done for representative reservoirs and fluids by varying both volume and energy and plotting the variation of extra height as a function of volume for different energies.

As discussed in the patents referenced above, the process of height determination conveniently takes place in an electronically-controlled measurement apparatus. The controller for this apparatus may comprise a computer or similar microprocessor based system which executes software or firmware, possibly assisted by one or more microprocessors designed specifically to perform algorithms of digital signal processing (DSP) or having particular advantages for the performance of such algorithms. Such a controller may also comprise communications hardware, for example a network interface, and corresponding software, to communicate with other laboratory automation equipment and general purpose computers. It will also be understood that certain acoustic ejection systems may possess or be connected to automated handling equipment which is also capable of inserting the reservoir with fluid under the direction of an electronic controller or similar system. The system may execute software or firmware which contains code designed to carry out the methods previously described. A user of the system may program its operation by a variety of methods, for example menus, a text based programming or scripting language, or by manipulating graphical representations of the actions to be performed. For example, it may be provided that a well plate or tube/tube holder is placed in a receiving structure and, with a simple click or key press, the system places the well plate or tube/tube holder into position for fluid height analysis, performs the methods described here for each well, and reports the results in a convenient manner.

Incorporation of the sub-ejection toneburst into a system that already provides height determination can be made quite transparent to the user—essentially the echo pulse waveform is replaced by a more complicated waveform consisting of the sub-ejection toneburst, a gap of some duration, and finally the normal pulse signal for height determination. The timing signals to gate the appropriate time region of data acquisition may easily be adjusted so that to the user little change is noticeable in the behavior of the system.

In a further aspect of the invention, an alternative means to distinguish the SR echo signal even more clearly using the dimple methodology would be to excite the transducer with a normal height determination signal, followed by a sub-ejection toneburst to produce a dimple, then followed by a second height determination signal. One would then capture the first echo signal from the unperturbed fluid surface, as well as the second echo signal from the perturbed (dimpled) fluid surface. One could then compare these two echo signals, for example performing a simple subtraction, to distinguish the TB echo component (that signal that was common to both echoes) from the SR echo components of the two signals. This extension of the method could improve further the ability to discriminate the surface reflection (SR) echo from the well bottom (TB) echo, for very low fluid fill conditions.

One could furthermore use this more complex, two-echo approach to improve height determination. For example, if one measured both echoes—that from the unperturbed and that from the perturbed fluid surface—during normal height determination, one could monitor the shift in the SR TOF due to the presence of the dimple in those wells for which the unperturbed fluid surface produced a robust SR signal (e.g., an echo signal amplitude of at least 0.5V). One could then use this information to dynamically adjust the SR TOF information from the dimpled fluid surface in those wells for which unperturbed fluid surface produced a lower SR echo amplitude.

A useful figure of merit for an acoustic height measurement system that handles well plates or other similar collections of reservoirs is percentage of wells for which the volume is off by a given percentage, such as 10%, 20%, or 30%. Alternatively, where there is a minimum height of fluid for successful ejection, a figure of merit could be the percentage of wells in which the fluid level is above the minimum height of fluid but is incorrectly determined to be below the minimum height. It is desirable, for example, that no more than about 1%, 2%, or 3% of wells have a height determined which is off by more than a given percentage or which is erroneously reported to be too low for successful ejection.

Knowing the height of the fluid in a reservoir, it is often possible from knowledge of the dimensions of the reservoir to determine the volume of the fluid. For example, for a reservoir with vertical side walls, the volume may be estimated as the height times the surface area of a cross-section of the reservoir in a horizontal plane.

In a further aspect of this invention, the height determination method described above is used to determine the height of a fluid for the purpose of ejecting a droplet from the fluid acoustically. This height determination may be carried out repeatedly during the process of ejection of multiple droplets from the reservoir.

In another aspect of this invention, use of the dimple may enable a decreased dead volume of fluid in wells in a well plate and an increased working range of fluid in wells in a well plate. These benefits can be achieved because more accurate fluid height determination may be possible when the fluid level in the well is low and/or the surface tilted, compared to systems not using the dimple. Similar benefits may be achieved for other reservoirs besides well plates. A further benefit of the use of a dimple may be superior ability to discriminate the echo from the fluid surface (SR), compared to the echo for example from the top of the plate bottom (TB), even when there is a measurable SR echo component in the unperturbed, non-dimple measurement. For sufficiently low fluid fills, the SR and TB echoes may be difficult to discriminate unambiguously, and because the dimple raises slightly the local fluid height, discrimination is improved.

In addition, with the dimple measurement one may measure the echoes both with and without the dimple present. By taking for example a difference between these two echo signals, one could remove entirely the echo components from the bottom and top of the plate bottom (BB and TB), and only see the delta in the SR echo component due to the dimple. This may permit better discrimination of the SR echo component, particularly in low fill cases.

It is to be understood that while the invention has been described in conjunction with the preferred specific embodiments thereof, the foregoing description is intended to illustrate and not limit the scope of the invention. Other aspects, advantages, and modifications within the scope of the invention will be apparent to those skilled in the art to which the invention pertains.

All patents, patent applications, and publications mentioned herein are hereby incorporated by reference in their entireties. However, where a patent, patent application, or publication containing express definitions is incorporated by reference, those express definitions should be understood to apply to the incorporated patent, patent application, or publication in which they are found, and not to the remainder of the text of this application, in particular the claims of this application.

The following examples are put forth so as to provide those of ordinary skill in the art with a complete disclosure and description of how to implement the invention, and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. and pressure is at or near atmospheric.

EXAMPLE

Figure 7:
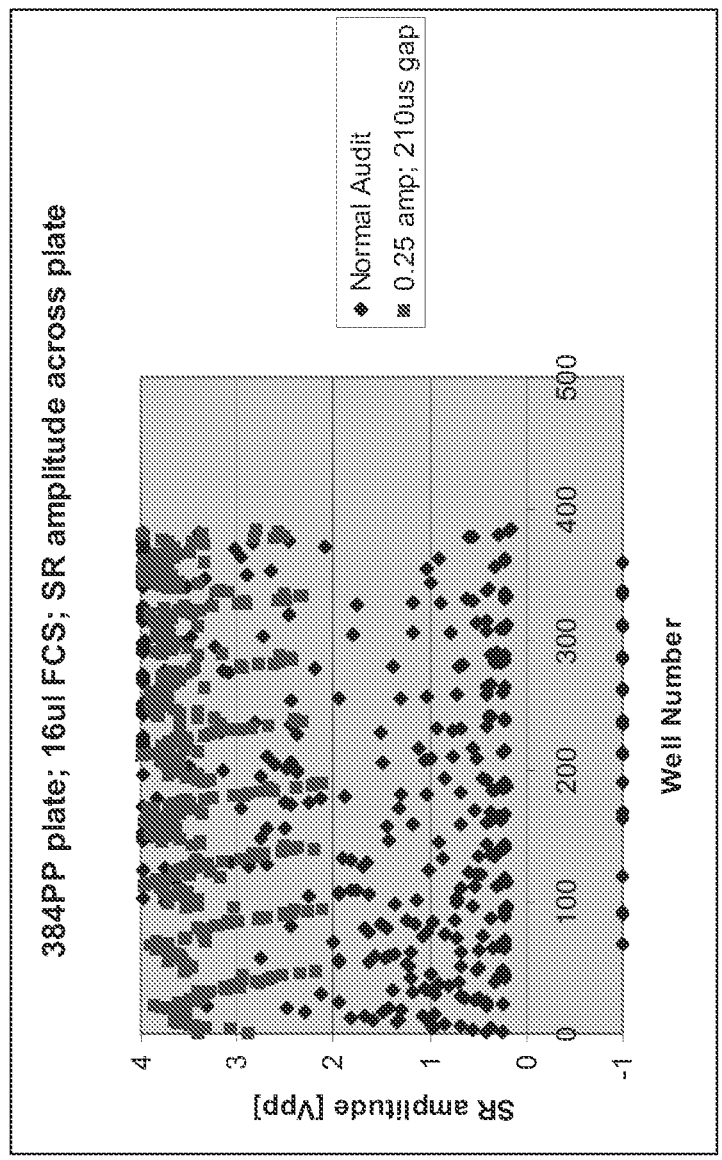
FIG. 7 depicts the distribution of SR amplitudes in an experiment.

An example of the effect of the sub-ejection toneburst on fluid height determination across a plate is shown in FIG. 7. Here, the surface reflection (SR) echo amplitude (Vpp) is plotted for each well in a 384-well polypropylene (PP) plate. Each well is filled with 16 µl, of 10% FCS in 1×PBS. The experiments were carried out on a Labcyte Echo® 555.

With no sub-ejection toneburst present, the SR amplitude is plotted as a lozenge shape (♦). It can be seen in FIG. 7 that many wells show very low SR amplitude. Those wells with surface reflection echo amplitudes of −1 in the graph correspond to wells for which no SR echo could be recognized at all. For the case where no SR echo was recognized at all, these wells would not have the correct height information thus compromising the capability for drop ejection (fluid transfer) and thereby resulting in a dropout or a false negative even if the well was filled with fluid at the same fill volume across the well plate.

The box-shaped data (■) in the plot correspond to use of a sub-ejection toneburst, whose amplitude is 0.93V. (This is the voltages from the Echo® 555's waveform generator, before the RF amplifier that drives the transducer.) The gap between the end of the sub-ejection toneburst and the start of the height determination pulse signal is 210 µs. The sub-ejection toneburst itself is identical in form to that used for fluid transfer of the 10% FCS in 1×PBS. It is seen in the figure that the introduction of the sub-ejection toneburst raises all SR echo amplitudes above 2 V plate-wide.

We claim:

1. A method for measuring a fluid in a reservoir, the method comprising:
   using a first burst of focused acoustic energy to raise temporarily a protuberance on the free surface of the fluid,
   directing a second burst of focused acoustic energy to the free surface of the fluid a delay time after a start time of the first burst of focused acoustic energy, the delay time being greater than zero and sufficiently short so that the second burst of energy will reflect from the protuberance before the protuberance relaxes back into the free surface of the fluid,
   detecting a set of echoes from the second burst of focused acoustic energy, and
   using the detected echoes from the second burst of focused acoustic energy to determine a height of the fluid.

2. The method of claim 1, wherein the second burst of focused acoustic energy begins at a time which is between 0.3 and 3.0 times the time at which the protuberance reaches its maximum height.

3. The method of claim 2, wherein the second burst of focused acoustic energy at a time which is between 0.6 and 1.5 times the time by which the protuberance reaches its maximum height.

4. The method of claim 1, wherein the free surface of the fluid is tilted.

5. The method of claim 4, wherein the free surface is tilted by at least about 5 degrees relative to horizontal before the second burst of focused acoustic energy is directed to the free surface of the fluid.

6. The method of claim 5, wherein the free surface is tilted by at least about 30 degrees relative to horizontal before the second burst of focused acoustic energy is directed to the free surface of the fluid.

7. The method of claim 4, wherein a preliminary burst of focused acoustic energy is directed along a line which intersects the free surface of the fluid at a point and wherein a normal to a plane tangent to the free surface of the fluid at the point is at an angle of no more than about 15 degrees relative to the line before the second burst of focused acoustic energy is directed to the free surface of the fluid.

8. The method of claim 7, wherein the normal is at an angle of no more than about 30 degrees relative to the line, before the second burst of focused acoustic energy is directed to the free surface of the fluid.

9. The method of claim 1, carried out taking as the reservoir each of the wells of a well plate in succession.

10. The method of claim 9, wherein there is a minimum height of fluid for successful ejection, wherein the heights as determined in the method are subject to error, and wherein in no more than about 3% of the wells in the well plate is the error large enough that a well which in fact has the minimum height is incorrectly determined not to have the minimum height.

11. The method of claim 9, wherein the time between height determination for successive wells is no more than about 0.1 s.

12. The method of claim 11, wherein the time between height determination for successive wells is no more than about 20 ms.

13. The method of claim 1, wherein the second burst of acoustic energy is generated at a point in time when the protuberance height is at least about 50% of its maximum height.

14. The method of claim 1, carried out under the control of a microprocessor-based system which contains information regarding the material properties of the reservoir and/or the fluid in the reservoir.

15. The method of claim 1, further comprising:
   prior to generating the first burst of focused acoustic energy, sending a preliminary burst of focused acoustic energy towards the fluid,
   detecting the echoes from the preliminary burst of focused acoustic energy, and
   comparing the echoes from the preliminary burst and the second burst as part of the process of determining fluid height.

16. The method of claim 15, wherein comparing the echoes comprises computing a difference between the echo waveforms from the preliminary burst and the second burst.

17. The method of claim 1, wherein the height which is determined is employed to position a focused acoustic radiation generator so that the focal point of the focused acoustic radiation is near the surface of the fluid.

18. The method of claim 1, wherein the height is determined by use of a correction factor which accounts at least in part for the additional height of the fluid caused by the dimple.

19. The method of claim 1, wherein the reservoir comprises polypropylene, polystyrene, or a cyclic olefin copolymer.

20. The method of claim 1, wherein the free surface of the fluid is concave.

21. The method of claim 1, wherein the free surface of the fluid is convex.

22. A system for measuring a fluid in a reservoir, the system comprising:
   an acoustic radiation generator,
   a focusing means for focusing the acoustic radiation,
   a mechanism for moving the acoustic radiation generator and focusing means relative to the reservoir,
   a detector to detect reflected acoustic energy, and
   a controller which
      causes the generator to generate a first burst of focused acoustic energy to raise temporarily a protuberance on the free surface of the fluid,
      causes the generator to direct a second burst of focused acoustic energy to the free surface of the fluid a delay time after a start time of the first burst of focused acoustic energy, the delay time being greater than zero and sufficiently short so that the second burst of energy will reflect from the protuberance before the protuberance relaxes back into the free surface of the fluid,
      causes the detector to detect a set of echoes from the second burst of focused acoustic energy, and
      uses the detected echoes from the second burst of focused acoustic energy to compute a height of the fluid.

23. The system of claim 22, wherein the generator and detector share a single piezoelectric transducer.

24. A method for measuring a fluid in a plurality of reservoirs, the method comprising:
   using a first burst of focused acoustic energy at sub-ejection first power level to raise temporarily a first protuberance on a first free surface of a fluid in a first reservoir;
   directing a second burst of acoustic energy to the free surface of the fluid a delay time after a start time of the first burst of focused acoustic energy at a second power level, the delay time being greater than zero and sufficiently short so that the second burst of energy reflects from the protuberance before the protuberance relaxes back into the free surface of the fluid;

detecting a first set of echoes from the second burst of acoustic energy;

determining the height of the fluid of the first free surface using the detected first set of echoes;

using a third burst of focused acoustic energy at a sub-ejection third power level to raise temporarily a second protuberance on a second free surface of a fluid in a second reservoir;

directing a fourth burst of acoustic energy to the free surface of the fluid a delay time after a start time of the third burst of focused acoustic energy at a fourth power level, the delay time being greater than zero and sufficiently short so that the fourth burst of energy reflects from the protuberance before the protuberance relaxes back into the free surface of the fluid;

detecting a second set of echoes from the fourth burst of acoustic energy; and determining the height of the fluid of the second free surface using the detected second set of echoes, wherein the first power level and the third power level are not the same.

25. The method of claim 24, wherein one of the sub-ejection pulses is at a power level where it would cause drop ejection if applied to the other free surface.

* * * * *